United States Patent [19]

Guido

[11] Patent Number: 5,462,259
[45] Date of Patent: Oct. 31, 1995

[54] TILTING DEVICE FOR A D.C. ARC FURNACE AND PROCESS FOR EMPTYING THE FURNACE

[75] Inventor: Heinz Guido, Duisburg, Germany

[73] Assignee: Man Gutehoffnungshutte Aktiengesellschaft, Oberhausen, Germany

[21] Appl. No.: 290,955

[22] PCT Filed: Dec. 17, 1993

[86] PCT No.: PCT/EP93/03596

§ 371 Date: Aug. 23, 1994

§ 102(e) Date: Aug. 23, 1994

[87] PCT Pub. No.: WO94/14983

PCT Pub. Date: Jul. 7, 1994

[30] Foreign Application Priority Data

Dec. 24, 1992 [DE] Germany ............... 42 44 228.1

[51] Int. Cl.[6] .................................................. C21C 5/52
[52] U.S. Cl. ................... 266/45; 266/236; 373/84; 373/115
[58] Field of Search ................... 266/236, 240, 266/45, 44; 222/604; 373/84, 115

[56] References Cited

U.S. PATENT DOCUMENTS

| 4,031,309 | 6/1977 | Chitil et al. | 266/240 |
| 4,679,773 | 7/1987 | Wunsche | 266/240 |
| 5,054,033 | 10/1991 | Wronka et al. | 373/84 |

FOREIGN PATENT DOCUMENTS 0845994 8/1952 Germany ................... 373/84

*Primary Examiner*—Scott Kastler
*Attorney, Agent, or Firm*—McGlew and Tuttle

[57] ABSTRACT

A tilting device for a direct current arc furnace and a process are disclosed for completely emptying the furnace while the furnace is operated with a continuous scrap supply through a lateral opening in the furnace vessel and removal bottoms. The scrap chute should remain in the opening of the furnace during the loading, melting, deslagging and tapping operations; it should be swiveled away only during the emptying of the furnace. The disclosed tilting device has a cam on the rolling cradle, so that the rolling mid-point remains at the zero position in a tilting range from ±5° to ±15°, and when the furnace is completely emptied it moves to another position in a parallel direction to the bottom tapping opening. The position of the bottom tap opening changes only insignificantly in order to protect the parts of the bottom electrode located outside the vessel of the furnace from heat radiated by steel in the casting ladle.

7 Claims, 6 Drawing Sheets

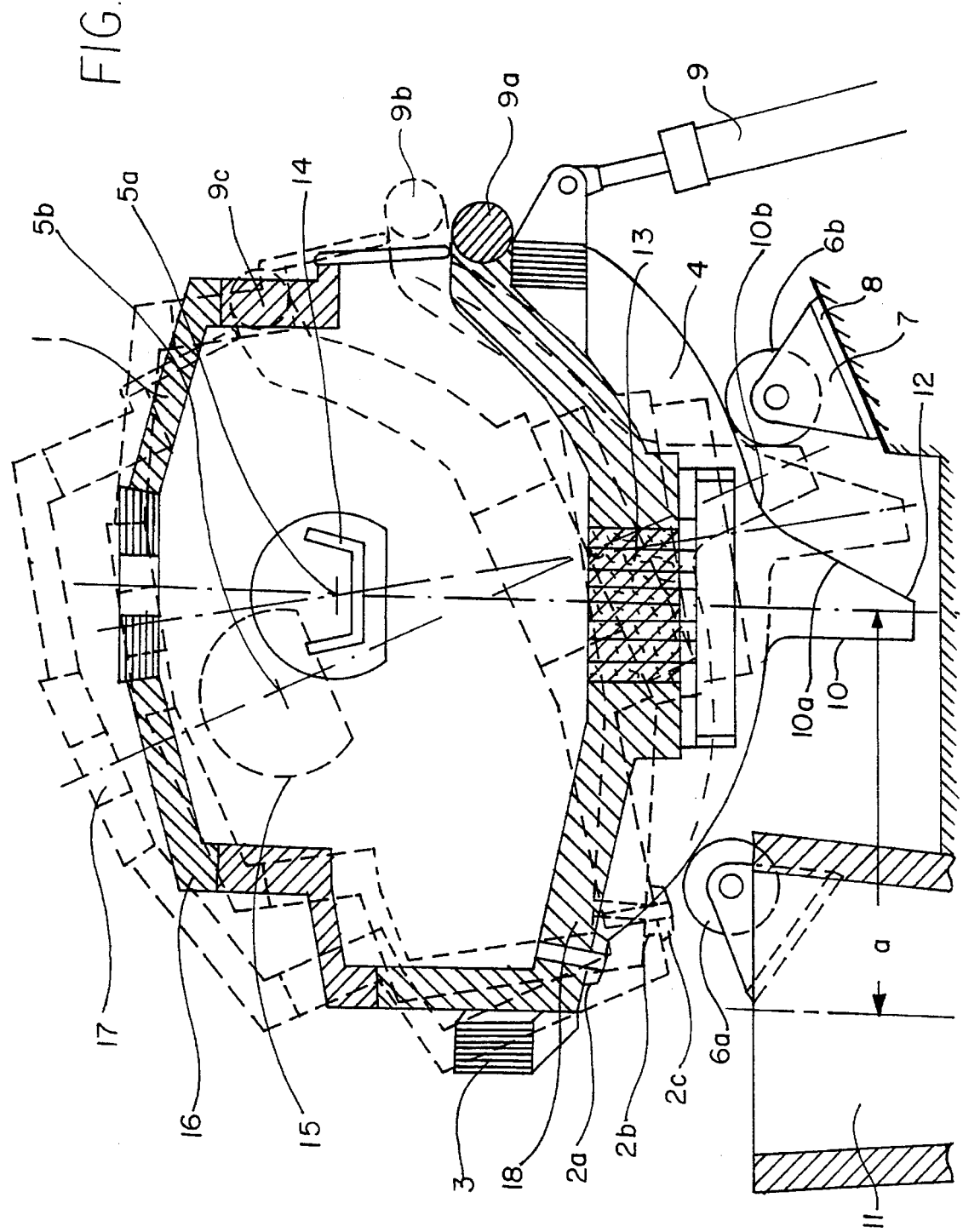

TILTING DEVICE FOR A D.C. ARC FURNACE AND PROCESS FOR EMPTYING THE FURNACE

FIELD OF THE INVENTION

The present invention pertains to a tilting device for a d.c. arc furnace with eccentric bottom tap hole and with electrodes following the tilting movement, whose furnace vessel has a lateral opening and a device for continuously introducing scrap iron, wherein the tilting device consists of rolling cradles arranged under the vessel frame, which are mounted on rollers rigidly arranged on the base frame of the furnace foundation and can be moved by means of hydraulic power drives.

The present invention also pertains to a process for completely emptying the furnace by means of the said tilting device.

BACKGROUND OF THE INVENTION

Arc furnaces for producing steel are provided with a device which makes it possible to tilt the furnace vessel to empty the melt into a casting vessel, e.g., a steel casting ladle, and to tap slag.

Designs in which the furnace vessel is seated in a vessel frame, which lies on at least two tilting cradles, have been known, on the one hand. During the tilting of the furnace, the toothed tilting cradle, which is usually of a circular design, rolls on a horizontal, likewise toothed substructure.

In another prior-art design, corresponding to the design according to FIG. 1, the tilting cradle of the furnace is designed to be such that it is mounted on rollers and is tilted by a drive mechanism into the tapping position as well as into the slag-tapping position.

A device for tilting electric arc furnaces, in which the electrodes do not follow the tilting movement, has been known from German Auslegeschrift No. DE-AS 1,084,445. The tilting of the furnace vessel with a discharge spout is achieved by means of a rolling path, which is displaceable during tilting and on which the rolling cradle rolls.

The rolling cradle has laterally arranged guide rails, which come into contact with the rollers during the movement of the cart located under the rolling cradle out of its normal position.

The right-hand guide rail comes into contact with the right-hand roller during the tilting of the vessel for tapping the molten steel, as a result of which it brings about the tilting of the vessel in a defined area around the upper fulcrum point.

Tilting into a fulcrum, which is located in the vicinity of the center of gravity of the furnace vessel, will then take place during the further movement of the cart/rolling path to the right. The guide rail now moves farther along the right-hand roller, but on the straight section of the guide rail.

The cart under the rolling cradle has both a carrying function and a moving function. The bilaterally mounted rollers have no carrying function, but are used for guiding only.

The disadvantage of the principle applied as the first state of the art is the fact that the center of the furnace is displaced there on the horizontal substructure corresponding to the tilting geometry and the rolling behavior of the tilting cradles, and it migrates either in the direction of the tapping side or in the direction of the slag-tapping side, depending on the tilting movement of the furnace vessel. There is a distance between the center of the furnace and the center of the tilting cradle, which is determined, in terms of design, by the value of the tapping weight.

One disadvantage of the second state of the art is the fact that during tilting, the bottom tapping device arranged in the vessel frame is displaced in the direction of the center of the furnace during the emptying of the steel from the furnace vessel. The consequence of this is that the steel casting ladle, which is located in a steel-removing cart, must move in the direction of the center of the furnace during tapping, corresponding to the tilting movements of the arc furnace. This means that the cart and the ladle must be moved farther under the furnace, especially when the furnace vessel must be completely emptied and no bottom residue may remain in the furnace vessel.

One disadvantage of the latter state of the art is the fact that the electrodes must be pulled out of the vessel for tilting the vessel, even over only a small tilting range.

Even though this tilting device makes it possible to completely empty the furnace vessel, the design is very complicated, because one or two displaceable carts/rolling paths with hydraulic drive is necessary, and with a widely protruding support structure are required for the travel path of the cart, which cannot be used for a d.c. arc furnace with supply devices arranged on the lower part of the vessel for a bottom electrode.

The travel path of the steel-removing cart with the steel casting ladle has limitations in terms of design in a d.c. arc furnace, because the devices for power supply and the cooling devices for the bottom electrode are installed under the bottom of the furnace vessel. In addition, these devices must be protected from the radiant heat of the molten steel in the steel casting ladle.

The prior-art tilting device according to the first state of the art also cannot be used when the arc furnace is to be supplied with preheated scrap iron continuously through an opening in the side wall in the area of the center of tilting via a stationary, covered chute and when the hot flue gases are to be drawn off at the same time through the cover of the chute to preheat the scrap iron to be charged in.

SUMMARY AND OBJECTS OF THE INVENTION

The of the present invention provides a tilting device for a d.c. arc furnace, in which the bottom tap hole of the furnace vessel is displaced by the smallest amount possible during tilting for complete emptying of the furnace. If tilting is to be performed only in a range between 5° and 15°, the bottom tap hole may be displaced, but the rolling center of the furnace vessel must remain in a predetermined position.

According to the invention, a tilting device for a direct current arc furnace is provided wherein the arc furnace has an eccentric bottom tap hole and is provided with electrodes which follow a tilting movement of the furnace. The furnace includes a furnace vessel which has a lateral opening and a device for continuously introducing scrap iron. The tilting device comprises rolling cradles which are arranged under the vessel frame and are mounted on rollers arranged rigidly on a base frame of the furnace foundation and hydraulic power drive means for moving the furnace. The rolling cradles are provided with a cam on an underside. The rolling cradles have contact points with the rollers defined in a tilting range between plus or minus 5° and plus or minus 15°. The rolling cradles have a shape of an arc, with a radius which originates from the rolling center of the furnace vessel. Beyond the defined tilting range, the arc shape of the rolling cradles passes over into a straight line in an area of the cam. The slope of this straight line relative to a tangent to the arc of the rolling cradle is selected to be such that the position of the bottom tap hole of the furnace vessel changes only insignificantly at most during a rolling of the rolling cradle over the cam. Rolling of the rolling cradle over the cam is brought about by the hydraulic drive means including a tilting cylinder. 5° to 15° is necessary for the normal furnace operation in the case of sump operation during steel tapping through the tap hole located in the bottom into the steel casting ladle and during slag tapping into the slag bucket located under the furnace, and that the scrap iron chute must remain in the opening of the furnace vessel even in this mode of operation and during the melting down, it is necessary to tilt the furnace only in the range of this limited tilting movement around the rolling center, which is also the center of the chute.

If the furnace must be tilted farther for complete emptying, the melting process is interrupted, the arc furnace is no longer charged with preheated scrap iron, hot flue gases are not drawn off any more, and the chute can be removed from the furnace. It is then possible to select a kinematics for the further tilting movement by the device according to the present invention, which makes it possible to achieve that the tap hole will not move farther toward the center of the furnace.

The device according to the present invention for carrying out the process is characterized in that a cam is arranged in a defined range on the arc-shaped rolling cradle of the vessel frame, which rolling cradle is mounted on the two rollers, and this cam comes into contact with the roller on the slag-tapping side when a tilting range of, e.g., +10° is exceeded, and it glides along it, and that the vessel frame is hinged to a hydraulic cylinder on the slag-tapping side of the furnace vessel, and it is raised on one side. Both rollers are mounted rotatably in a base frame lying on the furnace foundation.

A cam, whose contour may extend, e.g., vertically and in parallel to the central axis of the rolling center on the side of the bottom tap hole, is arranged centrally on the rolling cradle mounted on the two rollers. The rolling curve of the rolling cradle cam first extends in a straight line, which later conforms to the radius of the arc. The transition radius of the cam to the rolling cradle of the furnace vessel has a radius which corresponds to 1.1 to 3.0 times the radius of the rollers.

The device according to the present invention is characterized in that the rolling curve of the rolling cradle corresponds to an arc in a tilting range of ±5° to ±15° of the furnace vessel, and the position of the rolling center does not change during the tilting of the vessel. When this tilting range is exceeded, the rolling curve follows another geometry, and it corresponds to an arc with a greater radius, to a straight line or a parabola. In the case of a tilting range exceeding ±15°, the rolling center migrates on an arc corresponding to the direction of tilting of the furnace vessel.

After the ±15° position of the furnace vessel has been exceeded, the cam of the rolling cradle glides along the roller on the side of the pneumatic cylinder, the vessel frame is raised by the hydraulic cylinder on one side, and the furnace vessel can be completely emptied, while the position of the bottom tap hole changes only insignificantly during this emptying process.

When the vessel is tilted for slag tapping, the cam of the rolling cradle moves in the direction of the roller on the tapping side after leaving the zero position of the vessel frame. The cam does not participate in the tilting process during this phase. The rolling cradle lies on both rollers during the lifting movement of the hydraulic cylinder.

BRIEF DESCRIPTION OF THE DRAWINGS

One exemplary embodiment of the present invention is explained in greater detail on the basis of schematic drawings. In the drawings, FIG. 6 is a sectional side the furnace according to the present invention in the 0°, +10° and +25° tilted positions represented one on top of another.

DESCRIPTION OF FIGS. 1 AND 2

Figure 1:
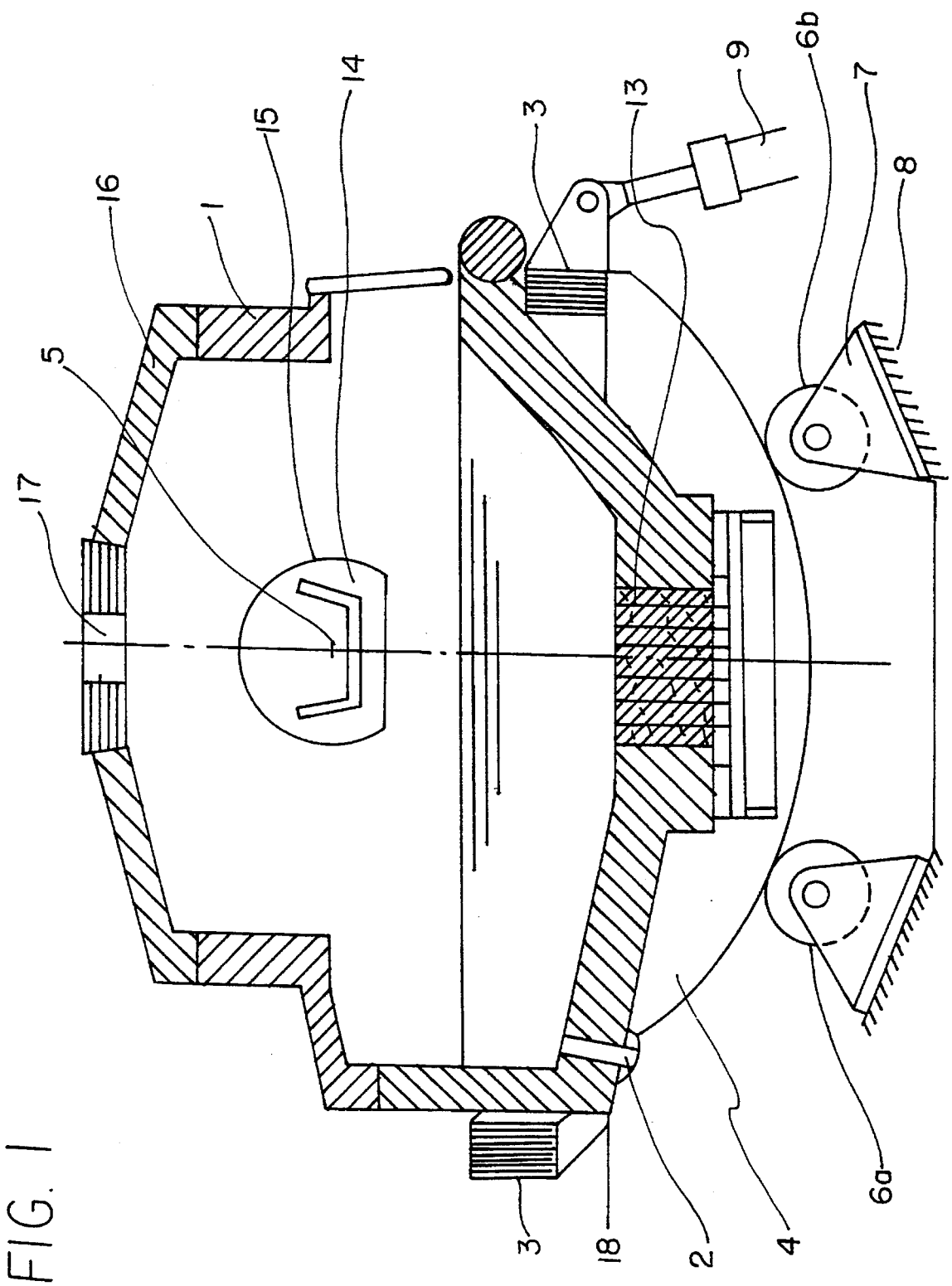
FIG. 1 is a sectional side view of a d.c. arc furnace with a bottom electrode and with a roller-type tilting device according to the state of the art.

FIG. 1 shows the side view of a d.c. arc furnace with a bottom electrode (anode) (13) arranged at the deepest point of the hearth bottom (18).

The upper part of the arc furnace consists of a partially water-cooled vessel (1), on which the cover (16) with the opening (17) for the graphite electrode (cathode) lies. An arc-shaped, water-cooled opening (15) for accommodating a scrap iron chute (14) is provided in the said water-cooled vessel (1). A flue gas collection line, not shown, in which the said scrap iron chute (14), which may be a vibrating feed chute, is connected to the said opening (15).

The lower part of the arc furnace consists of the vessel frame (3), which lies on two rolling cradles (4) and is nondetachably connected to them.

The said two rolling cradles (4) are rotatably mounted on the respective rollers (6a, 6b). The said rollers (6a, 6b) are in turn attached to the furnace foundation (8) on the base frame (7). The said entire furnace vessel (1) is pivoted by a hydraulic tilting device (9), while the said rolling cradles (4) glide on the said rollers (6a, 6b).

The bottom tap hole (2) for tapping steel into a steel casting ladle (11) is located on the outer left-hand side of the said hearth bottom (18).

Figure 2:
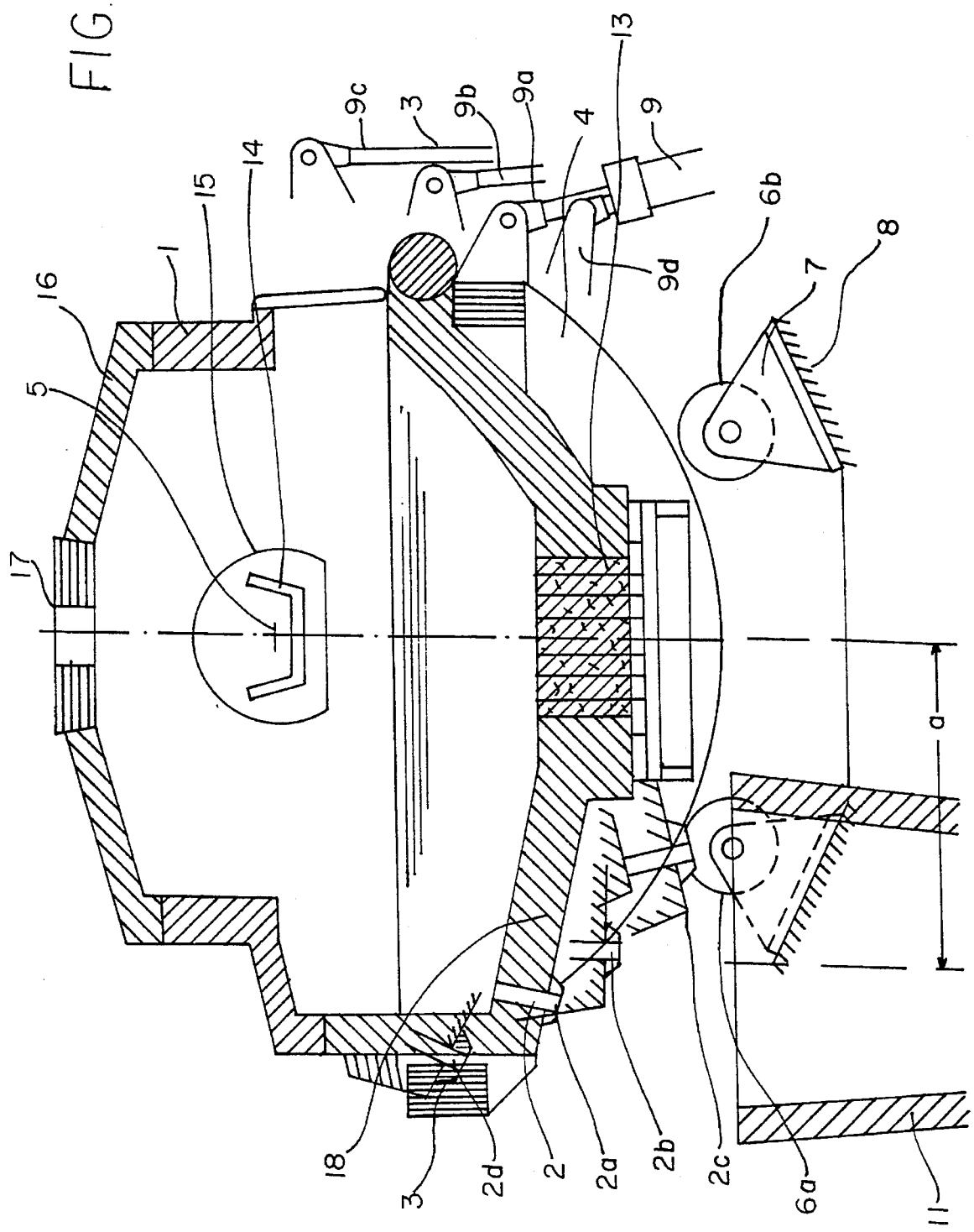
FIG. 2 is a view of a furnace as above, but with the 0°, +10°, and +25° tilted positions of the furnace.

FIG. 2 shows a series of the possible tilting positions of the arc furnace, wherein the position of the said bottom tap hole (2) is determined from the position of the said tilting cylinder (9). Positions (2a and 9a) show the 0° position, positions (2b and 9b) show the +10° position, and positions (2c and 9c) show the +25° position.

The so-called slag-tapping position at the −10° tilted position for slag to flow off during the melting and refining process is reached in the positions indicated by the positions (2d and 9d).

DETAILED DESCRIPTION OF THE PREFERRED EMBODIMENT

Figure 3:
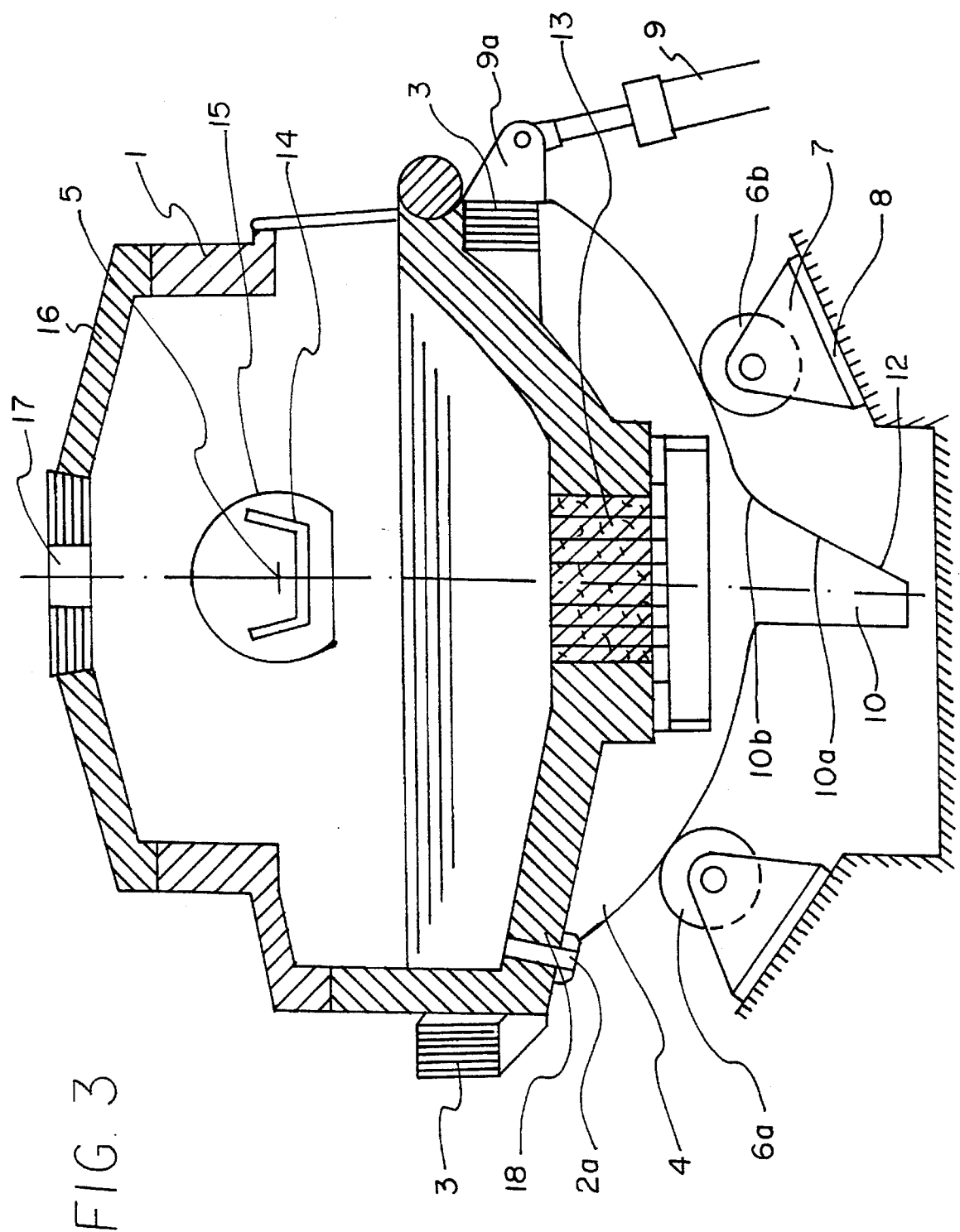
FIG. 3 is a sectional side view of a furnace with a roller-type tilting device according to the present invention.

FIG. 3 shows the side view of the tilting device according to the present invention. A cam (10), whose contour extends vertically and in parallel to the central axis of the rolling point (5) on the side of the said bottom tap hole (2), is arranged centrally on the said rolling cradle (4) mounted on the said two rollers (6a, 6b). The rolling curve (12) of the said rolling cradle cam (10) first extends in an oblique straight line (10a), which later conforms to the arc radius of the said rolling cradle (4).

Figure 4:
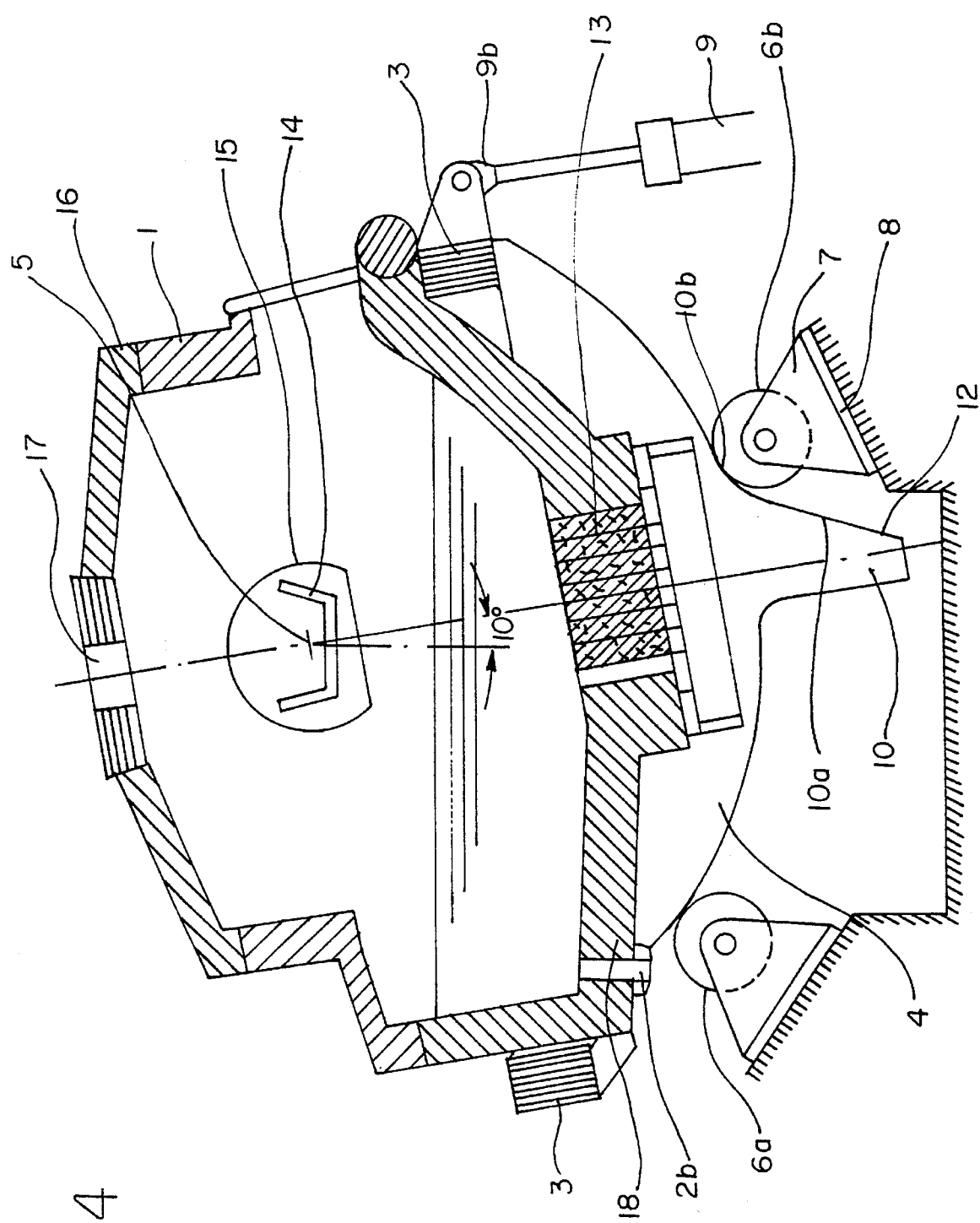
FIG. 4 is a sectional side view of the furnace according to the present invention in the +10° tilted position.

FIG. 4 shows the d.c. arc furnace in the +10° tilted position. The furnace is tilted up to the position (2b) of the bottom tap hole during steel tapping, while a residue of steel remains in the furnace as a continuous sump. The said rolling cradle (4) rolls on the said rollers (6a, 6b) until the radius (10b) of the said cam (10) reaches the said roller (6b). The said scrap iron chute (14) remains in an unchanged position at the said rolling center (5), while the said lateral opening (15) follows the tilting movement of the said furnace vessel (1).

Figure 5:
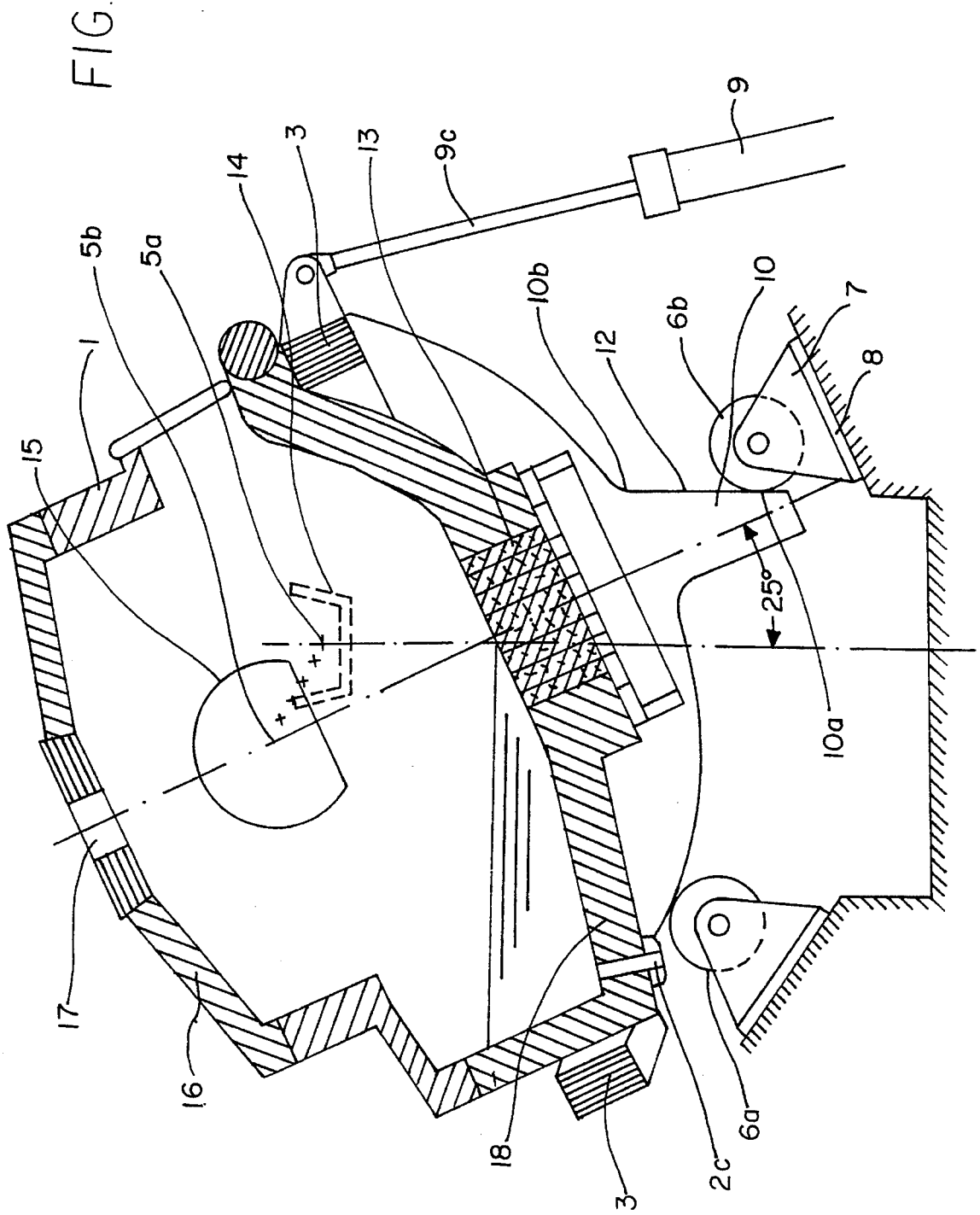
FIG. 5 is a sectional side view the furnace according to the present invention in the +25° tilted position.

FIG. 5 shows the d.c. arc furnace in the +25° tilted position (9c), in which the furnace can be completely emptied via the said bottom tap hole (2c) in order to make it possible to perform inspections on the said hearth bottom (18) and especially on the said bottom electrode (13). The said furnace vessel (1) is raised by the said hydraulic tilting cylinder (9) to the extent that the said rolling cradle (4) is lifted off the said roller (6b). In order for the stability of the said lower part (3, 4) of the furnace not to be lost during tilting beyond the +10° range, the said cam (10) glides along the said roller (6b), as a result of which it securely guides the said rolling cradle (4) on the said roller (6a).

In parallel to the tilting process, the rolling center (5a) is displaced into position (5b), and the said lateral opening (15) migrates, as does the said entire vessel (1), corresponding to the tilting movement.

The position of the said bottom tap hole (2a) changes only insignificantly during the tilting process into the +25° position. As can be recognized from FIG. 6, position (2b) at the +10° tilted position and position (2c) of the said bottom tap hole in the +25° tilted position are nearly identical.

The said steel casting ladle (11) can be positioned at a distance "a" during the complete tapping of steel. Heat radiation of the steel from the said ladle (11) is emitted vertically in the upward direction, and it reaches only the lower part of the furnace vessel in the area of the said bottom tap hole (2c), but not the said bottom electrode (13) with the corresponding power supplies, cooling lines, etc.

Furthermore, FIG. 6 shows the different tilted positions of the said furnace vessel (1), starting from the 0° tilted position (2a, 9a) up to the +25° position (2c, 9c). The rolling curve of the said rolling cradle cam (12) glides along the said roller (6b), corresponding to the tilted position of the said furnace vessel (1), and it transmits part of the forces originating from the weight of the furnace and the contents into the said roller (6b).

List of Reference Numerals

1—Furnace vessel
2—Bottom tap hole
2a—Bottom tap hole in zero position (charging, melting)
2b—Bottom tap hole in the +10° position (tapping)
2c—Bottom tap hole in the +25° position (emptying)
2d—Bottom tap hole in the −0° position (slag tapping)
3—Vessel frame
4—Rolling cradle
5—Rolling center of the arc furnace
5a—Position of the rolling center between the ±5° and ±15° tilted positions
5b—Position of the rolling center in the +25° tilted position
6a—Roller on the tapping side
6b—Roller on the slag-tapping side
7—Base frame
8—Furnace foundation
9—Tilting cylinder (hydraulic power drive)
9a—Tilting cylinder in the 0° tilted position
9b—Tilting cylinder in the +10° tilted position
9c—Tilting cylinder in the +25° tilted position
9d—Tilting cylinder in the −10° tilted position
10—Cam on the rolling cradle
10a—Straight line
10b—Radius
11—Steel casting ladle
12—Rolling curve on the rolling cradle cam
13—Bottom electrode (anode)
14—Scrap iron chute (device for introducing scrap iron)
15—Lateral opening in 1
16—Water-cooled cover of 1
17—Opening for graphite electrode (cathode)
18—Hearth bottom

I claim:

1. A tilting device for a direct current arc furnace, the furnace having an eccentric bottom tap hole and having electrodes following a tilting movement of the furnace, the furnace having a furnace vessel with a lateral opening and a device for continuously introducing scrap iron, the tilting device comprising: rolling cradles arranged under said vessel frame, said rolling cradles being provided with a cam on an underside; rollers arranged rigidly on a base frame of a furnace foundation, said rolling cradles having contact points with said rollers in a defined tilting range between ±5° and ±15°, said rolling cradles having a shape of an arc, with a radius originating from a rolling center of said furnace vessel, outside of said defined tilting range, said arc shape of said rolling cradles pass into a cam rolling surface portion, in an area of said cam, said cam rolling surface portion having a slope relative to a tangent to said arc of said rolling cradle which is selected to define cam means which substantially maintains the position of said bottom tap hole of said furnace vessel constant during a rolling of said rolling cradle over said cam rolling surface; and hydraulic power drive means, connected to said furnace vessel, for moving said furnace vessel, said hydraulic power drive means including a tilting cylinder.

2. Tilting device according to claim 1, wherein said cam has a transition radius which is 1.1 to 3.0 times a radius of said rollers, in a transition region from said arc of said rolling cradles to said cam rolling surface portion.

3. Tilting device according to claim 1, wherein in an area of said cam, said cam rolling surface portion is designed as one of a concave arc, a convex arc and a parabola, depending upon a required movement process of said furnace vessel and depending upon a required position of said bottom tap hole.

4. Tilting device according to claim 2, wherein in an area of said cam, said cam rolling surface portion is designed as one of a concave arc, a convex arc and a parabola, depending upon the required movement process of said furnace vessel and depending upon a required position of said bottom tap hole.

5. Tilting device according to claim 2, wherein said cam rolling surface portion is a straight line.

6. A process for emptying a direct current arc furnace provided with a tilting device, the furnace having an eccentric bottom tap hole and having electrodes following a tilting movement of the furnace, the furnace having a furnace vessel with a lateral opening and a device for continuously introducing scrap iron, the tilting device having rolling cradles arranged under said vessel frame, said rolling cradles being provided with a cam on an underside, rollers arranged rigidly on a base frame of a furnace foundation, said rolling cradles having contact points with said rollers in a defined tilting range between ±5° and ±15°, said rolling cradles having a shape of an arc, with a radius originating from a rolling center of said furnace vessel, outside of said defined tilting range, said arc shape of said rolling cradles pass into a cam rolling surface portion, in an area of said cam, said cam rolling surface portion having a slope relative to a tangent to said arc of said rolling cradle which is selected to define cam means which substantially maintains the position of said bottom tap hole of said furnace vessel constant during a rolling of said rolling cradle over said cam rolling surface and hydraulic power drive means, connected to said furnace vessel, for moving said furnace vessel, said hydraulic power drive means including a tilting cylinder, the process comprising the steps of: tilting the furnace vessel around a fixed rolling center by rolling the rolling cradles over said rollers, in a tilting range of ±5° to ±15° to displace a position of said bottom tap hole to a pouring position and subsequently, after said tilting range has been exceeded, and after removal of said scrap iron chute from said furnace vessel, displacing said bottom tap hole substantially only vertically, in a downward direction, from said pouring position to an inspection position wherein a rolling center is displaced to an inspection position.

7. A process for emptying a direct current arc furnace provided with a tilting device, the process comprising the steps of:

providing the furnace with a furnace vessel with a lateral opening and a device for continuously introducing scrap iron, an eccentric bottom tap hole and electrodes following a tilting movement of the furnace;

providing the tilting device with rolling cradles arranged under said vessel frame, said rolling cradles being provided with a cam on an underside, rollers arranged rigidly on a base frame of a furnace foundation, said rolling cradles having contact points with said rollers in a defined tilting range between ±5° and ±15°, said rolling cradles having a shape of an arc, with a radius originating from a rolling center of said furnace vessel, outside of said defined tilting range, said arc shape of said rolling cradles passing into a cam rolling surface portion, in an area of said cam, said cam rolling surface portion having a slope relative to a tangent to said arc of said rolling cradle which is selected to define cam means which substantially maintains the position of said bottom tap hole of said furnace vessel constant during a rolling of said rolling cradle over said cam rolling surface;

providing hydraulic power drive means, connected to said furnace vessel, for moving said furnace vessel, said hydraulic power drive means including a tilting cylinder;

tilting the furnace vessel around a fixed rolling center, by rolling the rolling cradles over said rollers, in the tilting range of ±5° to ±15°, to displace a position of said bottom tap hole to a pouring position; and subsequently, after said tilting range has been exceeded, and after removal of said scrap iron chute from said furnace vessel, displacing a rolling center to an inspection position, while said bottom tap hole is maintained substantially in position horizontally.

* * * * *